March 23, 1954  E. W. HOWE ET AL  2,672,652
MOLDING APPARATUS
Filed Oct. 24, 1947  11 Sheets-Sheet 3
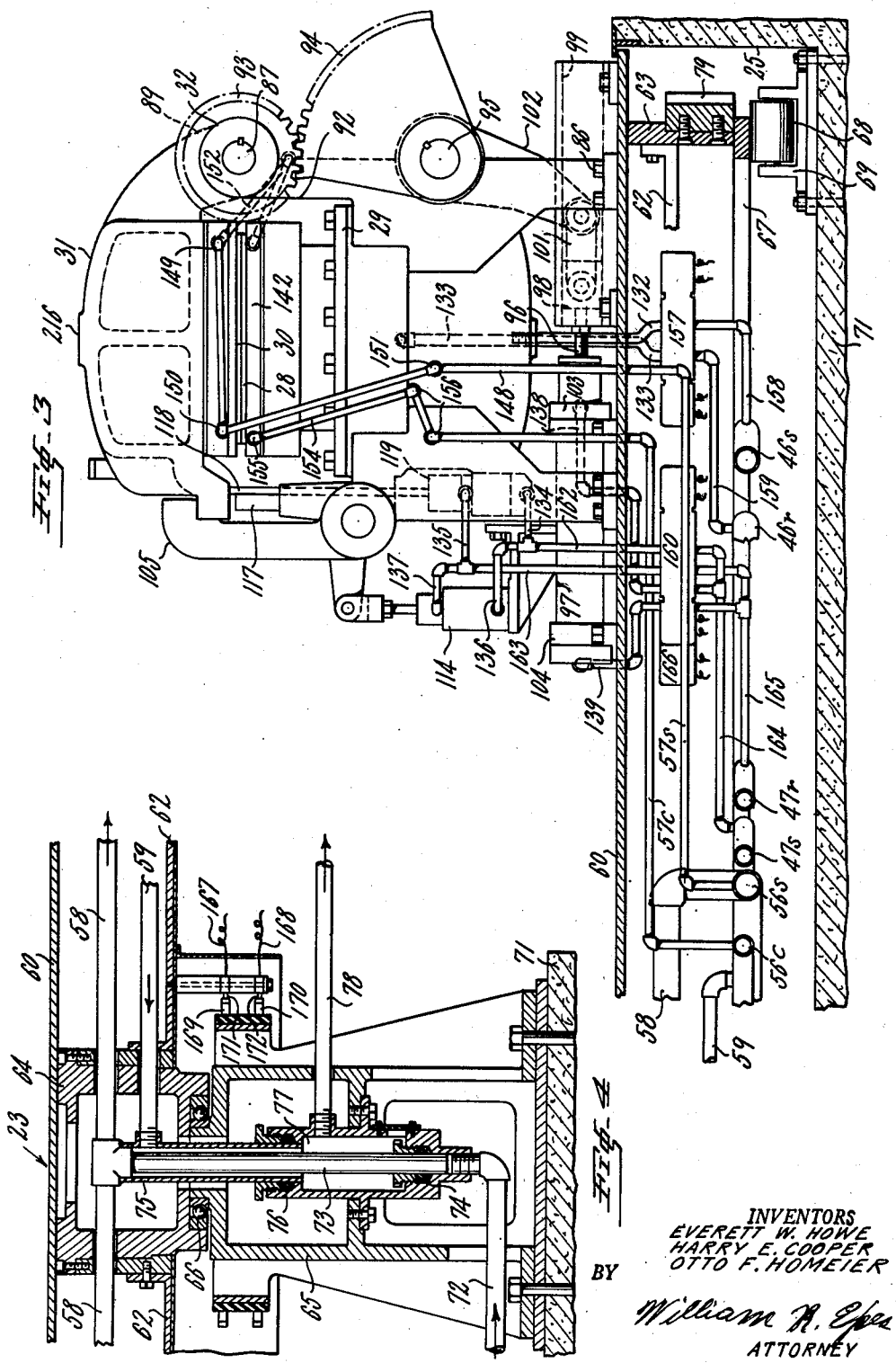
INVENTORS
EVERETT W. HOWE
HARRY E. COOPER
OTTO F. HOMEIER
BY
William R. Eyes
ATTORNEY March 23, 1954
E. W. HOWE ET AL
2,672,652
MOLDING APPARATUS
Filed Oct. 24, 1947
11 Sheets-Sheet 4
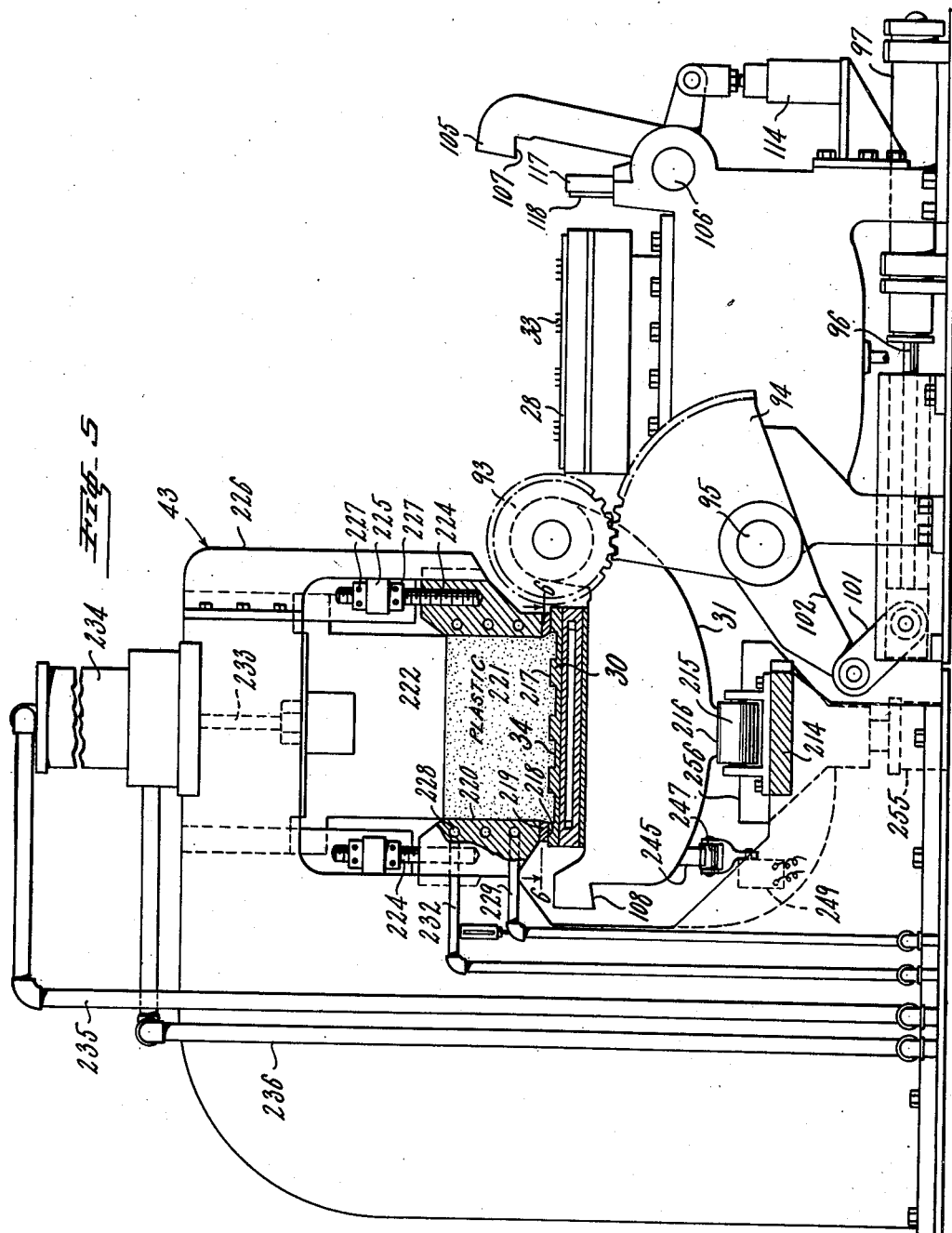
INVENTORS
EVERETT W. HOWE
HARRY E. COOPER
OTTO F. HOMEIER
BY
ATTORNEY March 23, 1954  E. W. HOWE ET AL  2,672,652
MOLDING APPARATUS
Filed Oct. 24, 1947  11 Sheets-Sheet 5
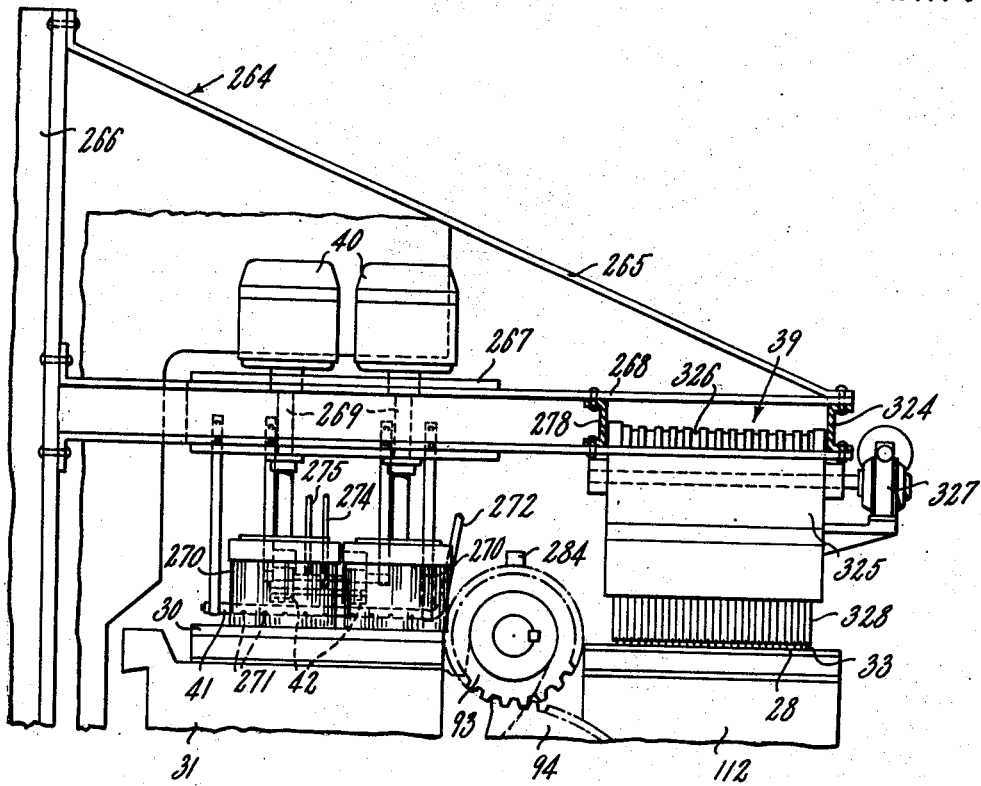
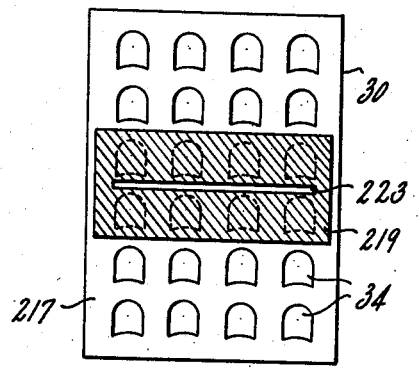
INVENTORS
EVERETT W. HOWE
HARRY E. COOPER
OTTO F. HOMEIER
BY
William H. Eber
ATTORNEY

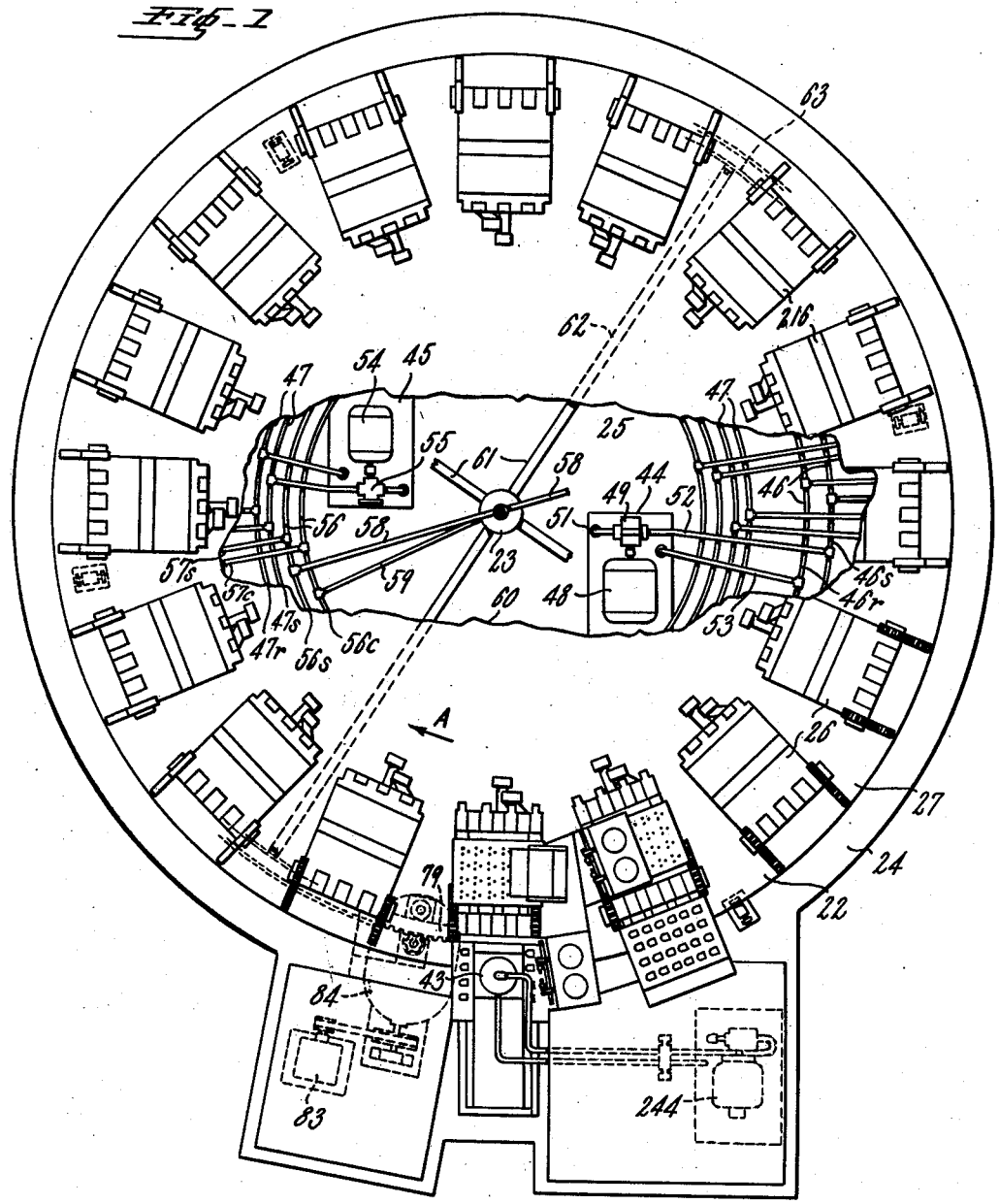

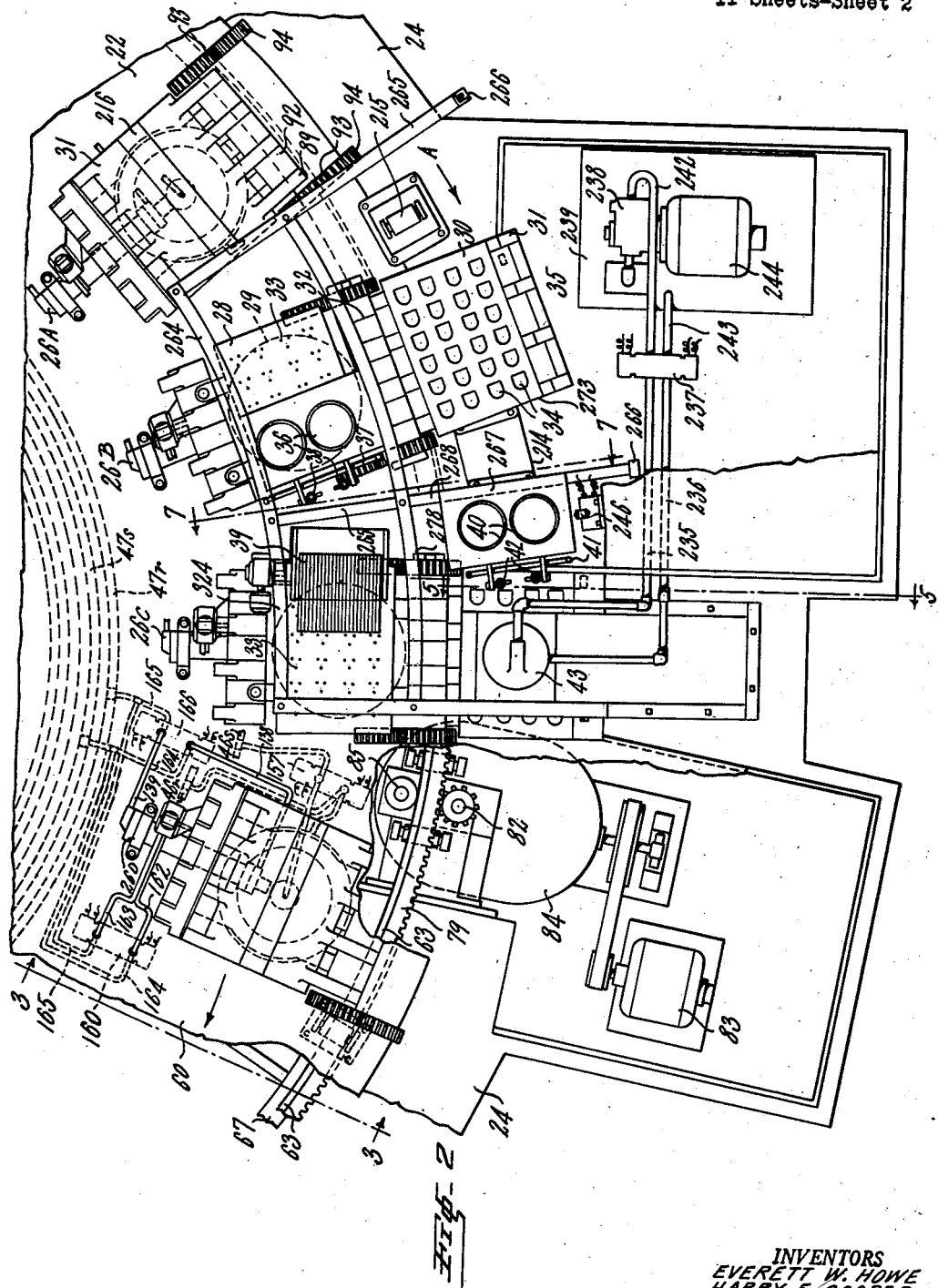

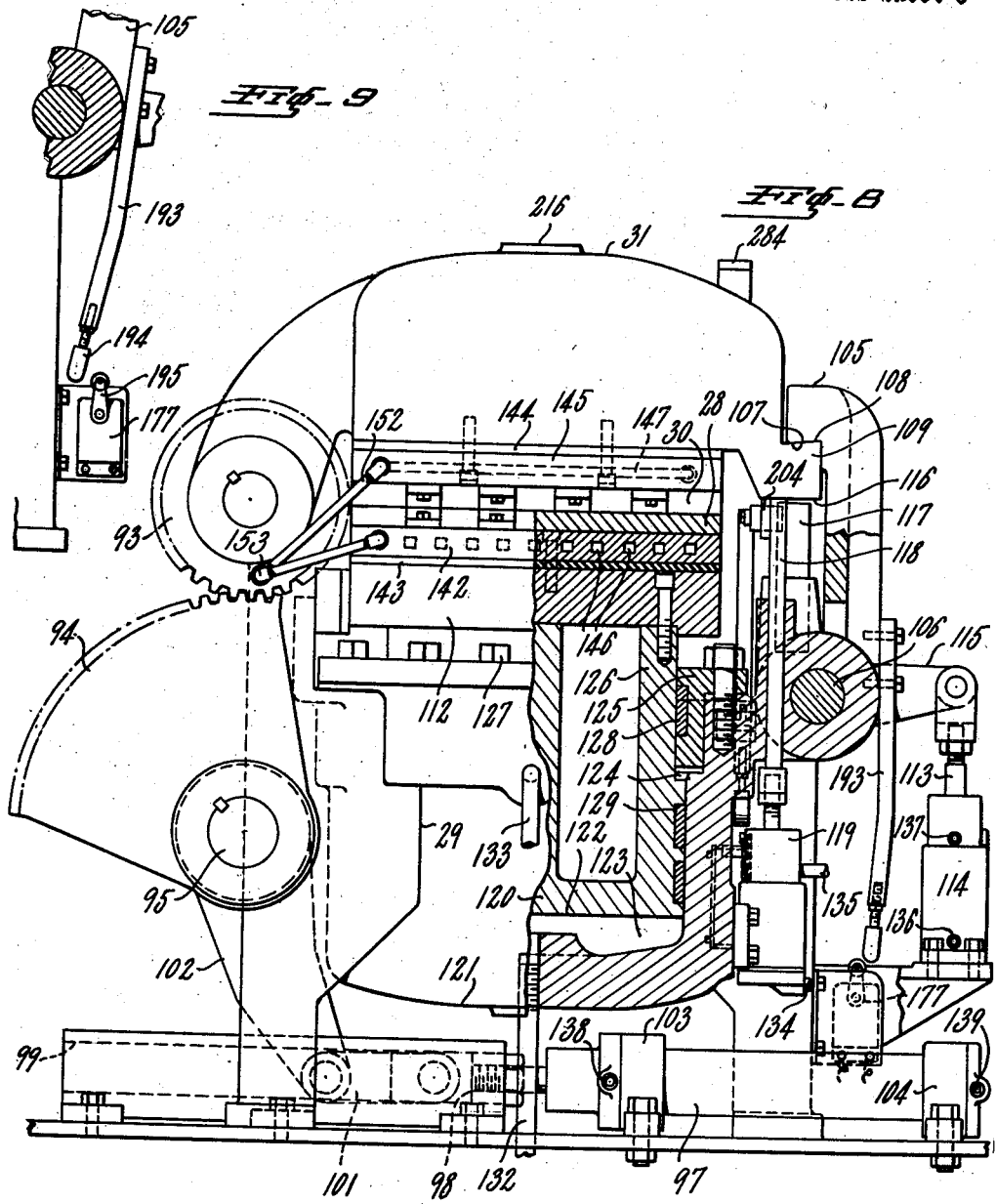

March 23, 1954
E. W. HOWE ET AL
2,672,652
MOLDING APPARATUS
Filed Oct. 24, 1947
11 Sheets-Sheet 7
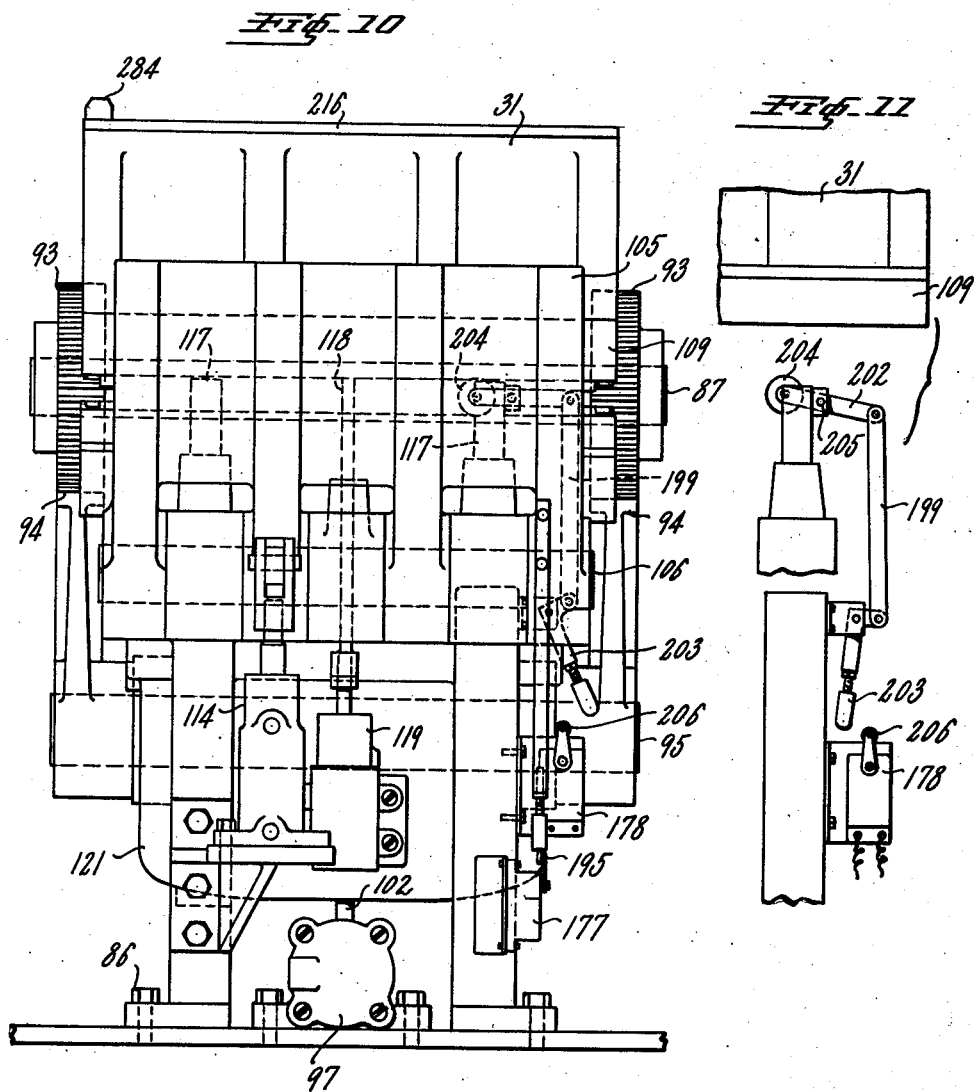
INVENTORS
EVERETT W. HOWE
HARRY E. COOPER
OTTO F. HOMEIER
BY
William H. Eper
ATTORNEY

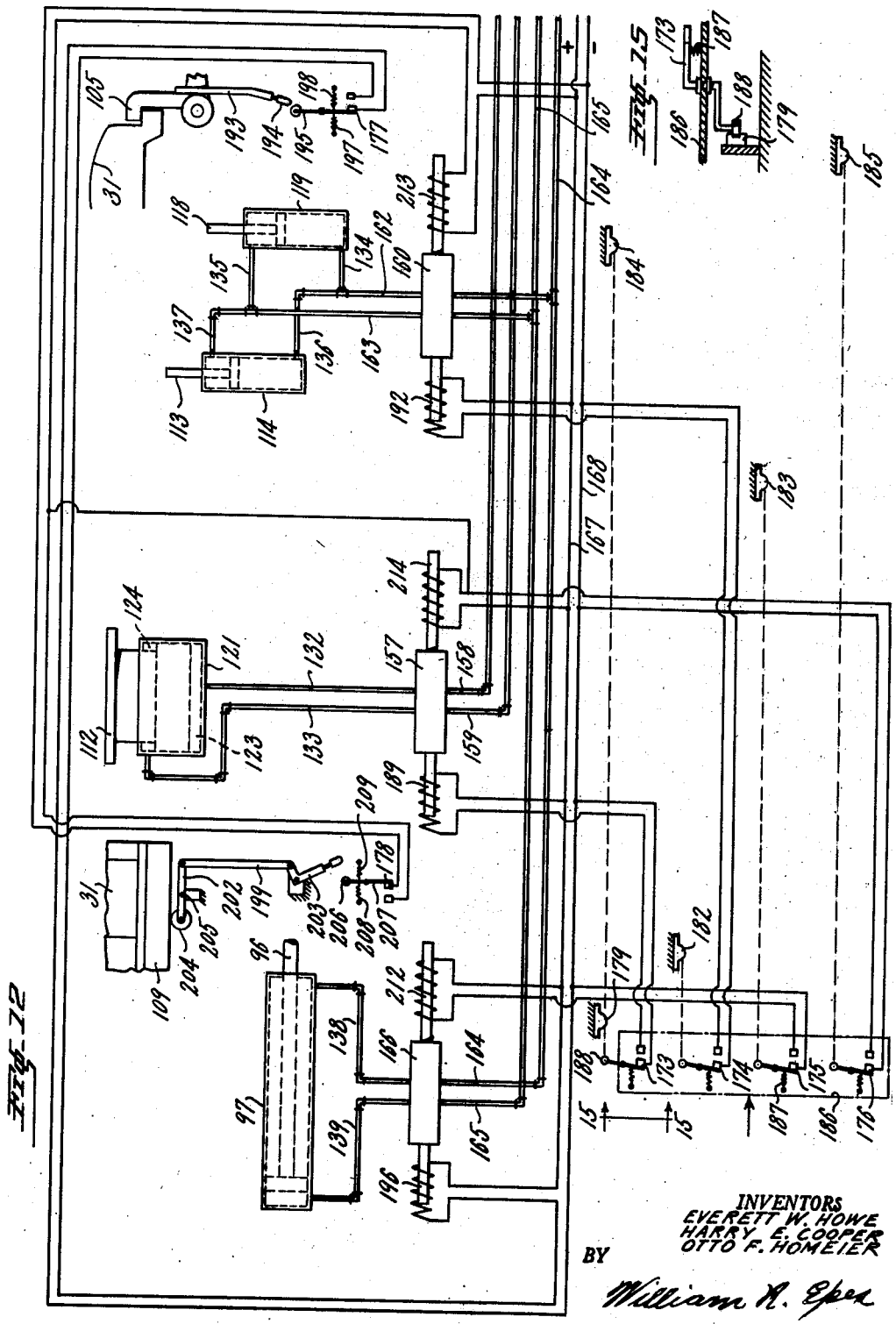

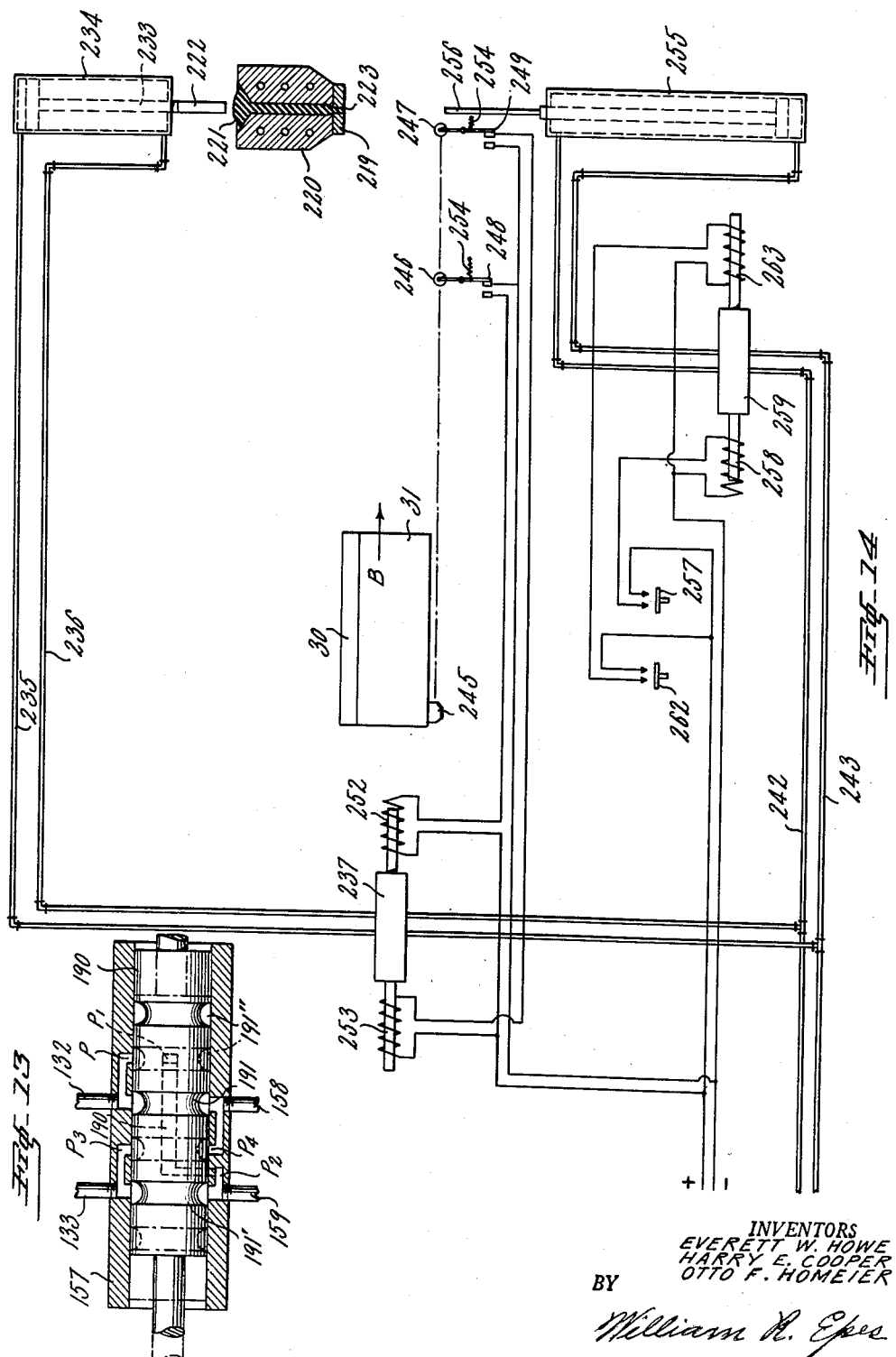

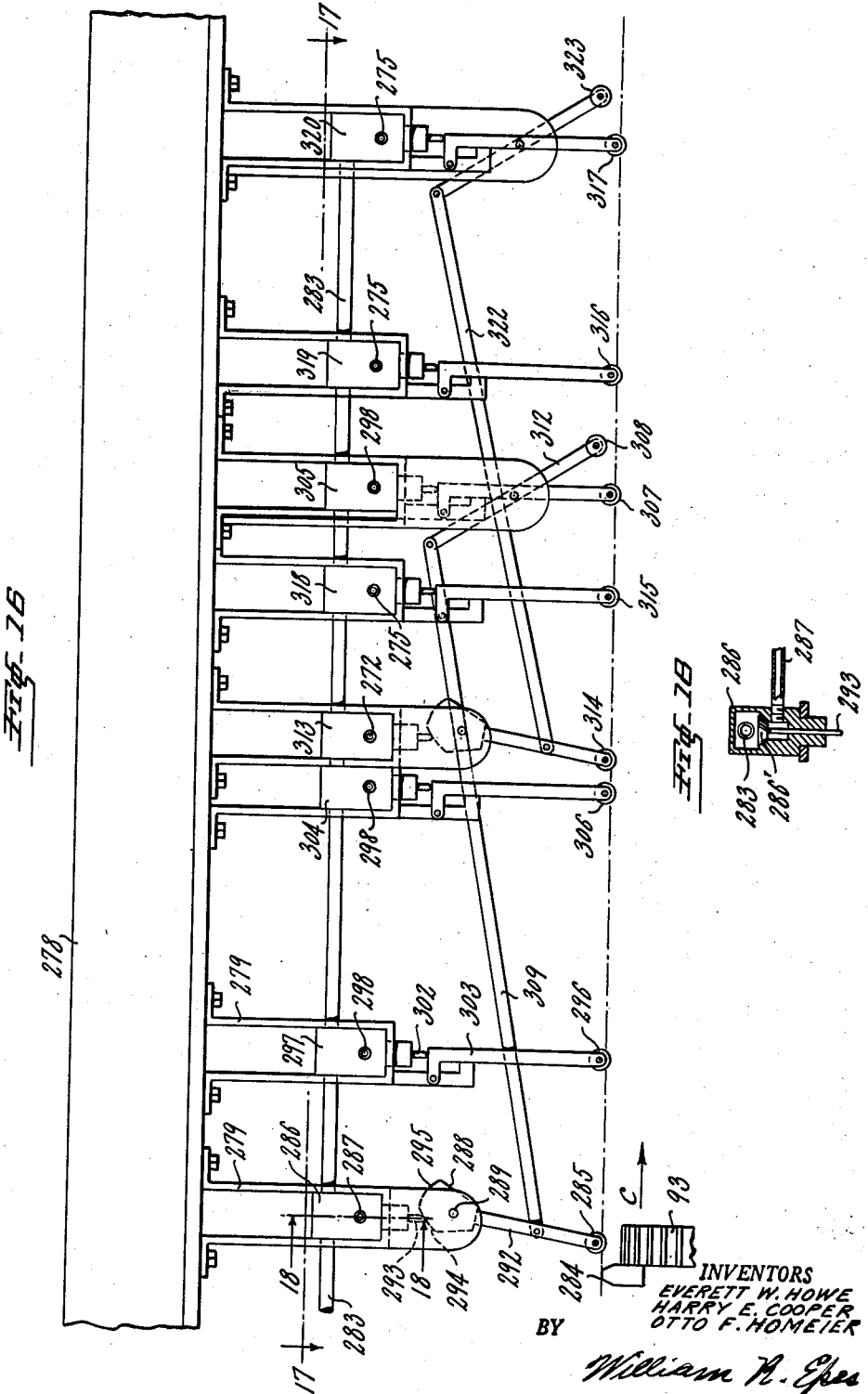

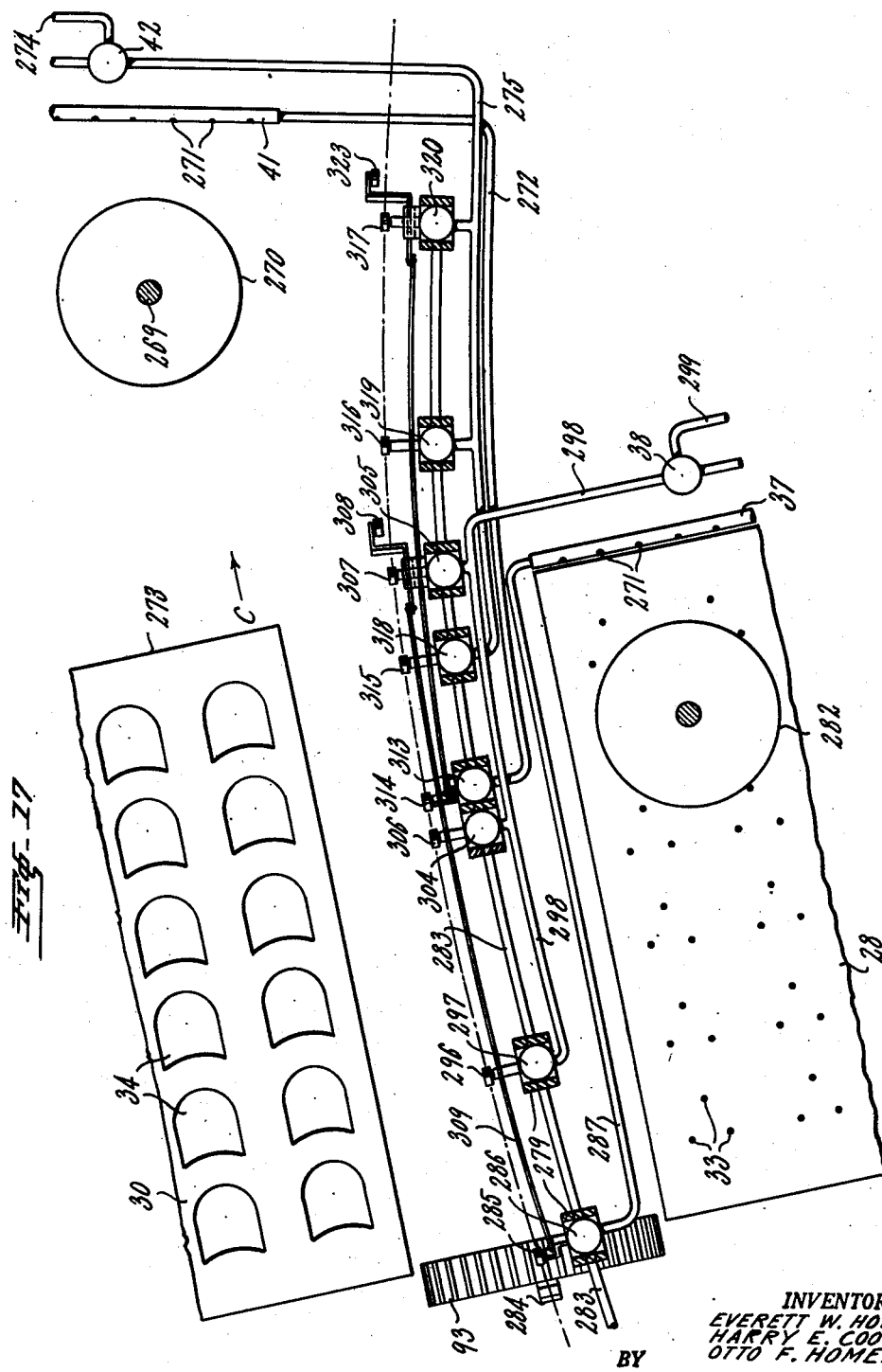

Patented Mar. 23, 1954

2,672,652

UNITED STATES PATENT OFFICE 2,672,652

MOLDING APPARATUS

Everett W. Howe, Cranston, R. I., and Harry E. Cooper, Pelham, and Otto F. Homeier, Baldwin, N. Y., assignors to United States Rubber Company, New York, N. Y., a corporation of New Jersey Application October 24, 1947, Serial No. 786,484

11 Claims. (Cl. 18—20)

This invention relates to an improved molding apparatus, and particularly to an apparatus comprising a turntable on which are mounted a plurality of improved molding and heat treating presses which are automatically opened and the mold halves therein are cleaned, lubricated and filled, and the presses are closed and heated during the continuous rotation of the table.

The apparatus is particularly suitable for utilizing large heavy two part molds in the manufacture of articles in relatively large quantities. All of the molding and curing operations are performed by the apparatus automatically, beginning with the operation of filling the mold cavities from a batch of plastic to be molded and ending with the preparation of the mold halves for refilling, except for the operation of removing the completed articles from the mold cavities.

Heretofore in the case where the molds were carried in curing presses on a turntable, articles to be molded therein were pre-molded in separate presses and transferred to the final shaping and curing mold cavities. In other cases the molds were automatically loaded outside the curing presses, and were either manually manipulated, or were manipulated by conveyor systems from station to station where they were transferred to various auxiliary apparatus for performing the necessary operations on the molds or the articles to be molded prior to being delivered to the curing press. Labor and time was consumed in the transfer of the molds from one piece of apparatus to the other and sometimes the molds were damaged by striking against each other and other objects. Furthermore such apparatus required more floor space for a set quantity of production, and a greater number of molds were required, because the molds were out of service longer intervals than in the present apparatus.

In accordance with the present invention the molds are securely fixed in heat curing presses located on the outer periphery of a turntable and they remain in the presses during the entire continuous cycle of operations, beginning with the preparation of the mold for filling the mold cavities and ending with the removal of the cured articles from the mold. The apparatus so constructed and operated has the following advantages: (1) the manipulation of the mold parts is positively controlled to prevent them from impacting each other and other objects during their closing and opening movements; (2) the danger of the mold parts being dropped and broken is eliminated; and (3) the molds are continuously in use and give a greater production per mold and for a given floor space.

The invention has more specialized advantages when embodied in an apparatus particularly adapted for molding rubber heels which are provided with washers for retaining the heads of nails which have been customarily used to secure the heel to the shoe. In such heels molding apparatus, one of the mold halves comprises a plate having pins projecting from its surface for receiving the washers. The pin plate is carried by the base of the press. The other mold half comprises a cavity plate secured in the press cover. The cover is connected to the base of the press by a hinge joint, and it is adapted to be rotated through substantially 180° from its matched position over the pin plate to its inverted filling position. This construction has the advantage of permitting the mold cavities to be automatically stuffed from a batch of plastic to be molded into heels while the washers are being placed on the pins, which remain in an upright position while the filled cavity plate is subsequently rotated to its matched or mold closed position over the pin plate. The presses being so constructed and operated, time is saved in filling the cavities, and since the cavity plate is rotated instead of the pin plate, no means other than the washer pins is required to retain the washers on the pins.

The molding and curing presses have other improved characteristics, such as the means for operating the cover and locking it in place.

The invention will be more clearly understood by referring to the following description and the accompanying drawings, in which:

Fig. 1 is a plan view of the molding apparatus on a small scale;

Fig. 2 is a plan on a larger scale of a sector of the turntable in the arc of rotation in which the presses are opened, and the molds are emptied, cleaned, lubricated and filled, and the presses are closed;

Fig. 3 is an enlarged side elevational view taken on line 3—3 of Fig. 2 of a press mounted on the outer circumference of the turntable, which is shown partly in section;

Fig. 4 is a vertical cross-sectional view of the pintle center of the turntable;

Fig. 5 is an elevational view of the open molding press, and showing the stuffing apparatus filling the upwardly turned cavities in the cavity plate taken approximately on line 5—5 of Fig. 2 with parts broken away;

Fig. 6 is a horizontal section through the stuffing press nozzle and a top plan view of the cavity plate passing underneath the nozzle, taken on line 6—6 of Fig. 5;

Fig. 7 is an enlarged elevational view of a portion of the top of the molding press, taken on line 7—7 of Fig. 2, and showing the cavity plate passing underneath the cleaning brushes and lubricating nozzles, and the washer pin plate forming the other mold half passing underneath the washer placing machine;

Fig. 8 is a side elevational view of the press, shown partly in section and taken from the opposite side of the press shown in Fig. 3;

Fig. 9 is an elevational view of the electrical switch mechanism in the position it occupies after being operated by the locking mechanism of the pressed cover from its locked position as shown in Fig. 8 to its unlocked position;

Fig. 10 is an elevational view of the side of the closed press, which faces towards the pintle center;

Fig. 11 is an elevational view of the switch mechanism operable by the fragment of the press cover as it nears the end of its closing movement;

Fig. 12 is a wiring and piping diagram illustrating the automatic controls for the molding press carried by the turntable;

Fig. 13 is a cross-sectional view of an electrically controlled hydraulic valve employed in the control system;

Fig. 14 is a wiring and piping diagram illustrating the automatic control of the mold stuffing apparatus by the press cover;

Fig. 15 is an enlarged detailed view of a part of the control apparatus shown in Fig. 12 and taken on line 15—15;

Fig. 16 is an elevational view of the controls for the cleaning and lubricating air valves;

Fig. 17 is a plan view of the valve controls shown in Fig. 16, taken on line 17—17 of that figure, and also showing portions of the mold halves to be cleaned and lubricated; and Fig. 18 is a cross-sectional view of a control air valve taken on line 18—18 of Fig. 16.

This invention is described in reference to a machine for molding rubber heels for footwear. In some footwear constructions, the rubber heels are nailed on to the shoe, as in the case of leather soled shoes, and in other shoe constructions the rubber heels are secured to the shoe by an adhesive bond, as in the case of rubber soled canvas and waterproof footwear. In the first case it is customary to anchor metal inserts or washers in the heels to receive the nails and form an abutment for the nail heads to prevent them from pulling through the heel. In the second case no nails are used and the heel washers are dispensed with.

The machine disclosed herein is adapted to incorporate nail retaining washers in the heels, but if desired the washer incorporating apparatus may be eliminated and the machine may be used to mold washerless heels, as well as other articles.

Referring to Fig. 1, the apparatus comprises a turntable 22 which rotates about a pintle center 23 and within the stationary periphery 24 of a well 25, shown at the broken away portion at the center of the apparatus. The turntable 22 rotates in a clockwise direction as viewed from above and as indicated by the arrow A thereon. The turntable carries a plurality of molding and vulcanizing presses 26 on its outer periphery 27.

As the presses 26 rotate in the direction of arrow A through the fixed arc of the periphery 24 of the well, shown in Fig. 2, each press is automatically opened, and the molded articles are removed. The mold halves are then automatically cleaned, and lubricated, and the heel molding cavities in one of the halves are filled, while the nail retaining washers are placed on pins projecting from the other mold half, and the press is then closed. The presses 26A, 26B, 26C, and 26D are shown in their various positions on the arc, at the times the several operations are being, or about to be performed. Beginning on the right, the first press 26A is about to begin its opening movement. The second press 26B has reached its fully opened position, and the third press 26C is still open. The fourth press 26D has just closed. As shown in the open press 26B, one of the mold halves, comprising the pin plate 28, is carried by the press base 29. The other mold half, comprising the cavity plate 30, is carried by the press cover 31, which is pivoted on the press base by the hinge joint 32. The pins 33 in the plate 28 are adapted to receive the heel washers and are positioned in groups to match with the cavities 34 in the plate 30, when the press is closed.

Considering the operation of a single press, and assuming that the press 26A, for example, is loaded with cured rubber heels, when it opens to the position shown by press 26B, the heels are pulled away from the pin plate 28 and they remain in the cavities 34 of the cavity plate 30. The heels are removed from the cavities by an operator standing at a station 35 opposite the open cover 31. The heels may be removed in the usual manner by means of an air nozzle, and they may be raked into a container (not shown) at the edge of the press cover 31. While the heels are being removed from the cavity plate 30, the pin plate 28 passes underneath a stationary cleaning apparatus comprising brushes, which are driven by overhead motors 36. Such brushes and motors are the same as the brushes 270 driven by motors 40 in Fig. 7. The cleaning apparatus includes an overhead air pipe 37 having outlets therein which discharge a blast of air onto the pin plate 28. The brushes loosen adhering particles of molding material from the pin plate 28 and the air blast blows them from the plate. The pin plate 28 next passes underneath lubricant spray nozzles 38 which are positioned immediately behind the air blast pipe 37. The nozzles 38 spray the face of the plate 28 with a solution which reduces the tendency of the molding material to stick to the plate. The solution is known in the art as a lubricant and may be made from water and soap, or other adhesive preventing materials. The pin plate 28 then passes underneath a stationary washer placing machine 39, which may be of the type and may operate in the manner disclosed in United States Patent Nos. 1,501,492 and 1,822,099 for depositing washers on the pins 33.

Immediately after the heels have been removed from the cavity plate 30 at the station 35, and while some of the foregoing operations are being performed on the pin plate 28, the cavity plate passes underneath a cleaning and lubricating apparatus similar to that employed for cleaning the pin plate 28 and which is shown in elevation in Fig. 7. This cleaning apparatus comprises brushes 270 (Fig. 7) which rotate in contact with the face of the cavity plate and are driven by the motors 40. The cleaning apparatus includes a pipe 41 for discharging a blast of air onto the face of the plate 30 to blow away the particles of molding material which was loosened by the brushes. The cavity plate 30 then passes under the lubricating nozzles 42 which spray the anti-adhesive, or lubricating solution onto the plate 30 and into the cavities 34. After the cavity plate has thus been prepared for the reception of the plastic molding material, it passes underneath the mold cavity filling apparatus 43, which forces the plastic molding material into the cavities 34 and fills them even with the top surface of the plate 30. After the cavity plate 30 has passed underneath the mold filling apparatus 43, and the heel washers have been applied to the pins 33 by the washer placing machine 39, the press is then closed by pivoting the cover 31 about the hinge joint 32 to its closed position as shown by the press 26D. The press continues to rotate through its heat curing arc until it reaches the position of the press 26A. During such arc of rotation, the molded material in the cavities 34 is heated and cured, and when the press reaches the position of press 26A it is again opened and the foregoing operations are repeated on the particular press. Each press passes through the same sequence of operations one after the other in the order of its arrangement on the turntable 22.

Turntable

Referring to Fig. 1, the turntable 22 is provided with a self-contained high pressure hydraulic power plant 44 and a low pressure hydraulic power plant 45 for operating the presses 26. The high pressure plant may operate on a pressure of 2,000 lbs. per sq. in., and the low pressure plant may operate on a pressure of 1,000 lbs. per sq. in. These figures are merely given by way of example, and of course the apparatus may be designed to operate upon other pressures. Two systems of pipes 46 and 47 extending in rings around the turntable 22 are provided for conveying the hydraulic fluid between the presses 26 and the high and low pressure plants 44 and 45, respectively. The high pressure plant comprises a motor 48 which drives a pump 49 having its intake side connected to a tank 51 and its delivery side connected to a pipe 52 leading to the supply side 46s of the high pressure system 46. A pipe 53 leads from the return side 46r of the system of pipes 46 back to the tank 51. The low pressure power plant 45 supplies hydraulic fluid to the low pressure system of pipes 47 by means of a motor 54 which operates a pump 55 in a manner similar to the high pressure power plant.

The turntable 22 carries a system of steam supply and steam condensate return pipes 56, comprising two rings which extend around the turntable. The system conveys the heating medium to and from the various presses 26 by means of branch pipes 57s and 57c extending between the rings of pipes and the presses. The steam supply ring pipe 56s is supplied with steam from a source outside of the turntable which is led in through the pintle center 23 and is conducted therefrom to the supply side 56s by pipes 58. The steam condensate from the condensate ring 56c is conducted back to the pintle center by a pipe 59 and through the pintle center to the steam regenerating plan.

The power plants 44 and 45 and the system of pipes 46, 47 and 56 are located underneath the top cover 60 of the turntable and are supported on the frame work of the table comprising a spider 61 having spokes 62 which extend from the pintle center 23 to an outer ring member 63 of the turntable.

The construction of the pintle center 23, and the manner in which the supply steam and condensate is conveyed to and through the pintle will now be described in reference to Figs. 3 and 4. The ends of the spokes 62 are secured to the rotatable cap 64 on the stationary base 65 of the pintle center 23 and to outer supporting rings 63 of the turntable 22. The cap 64 is rotatably supported by the thrust bearing 66 on the pintle center base 65. The outer ring 63 is secured to and supported on an annular track 67 mounted on rollers 68 journalled in brackets 69 secured to a foundation 71 comprising the bottom of the well 25 for the turntable. Thus the turntable 22 rotates about the thrust bearing 66 and on the rollers 68 which carry most of the weight of the table.

As shown in Fig. 4, the steam for vulcanizing the rubber heels is conveyed to the turntable 22 through a pipe 72 which leads into the pintle center base 65. The pipe 72 is connected to a pipe 73, which rotates with the turntable in a stationary stuffing box 74. The pipe 73 extends upwardly through the bearing 66 and is connected to the pipes 58 of the supply side 56s of the system of the steam pipes 56. The supply side 56s is connected through the presses 26 and the pipes 57 to the condensate side 56c by the pipe 59, as shown in Fig. 1. The condensate pipe 59 extends through the side of the rotatable cap 64, and is connected to a pipe 75 which surrounds the steam supply pipe 73, and passes downwardly through the bearing 66 and into a stationary stuffing box 76, in which it rotates. The pipe terminates in a chamber 77, to which is connected a pipe 78 which conducts the condensate to the steam generating plant (not shown).

Referring to Figs. 1, 2 and 3, the turntable 22 is rotated by a ring gear 79 secured to the supporting ring 63 and driven by a pinion 82. A motor 83 drives the pinion 82 through a train of reduction gears in the case 84. A thrust roller 85 rolls on the inner periphery of the track 67 to take the radial thrust of the pinion 82 on the ring gear 79.

Molding and vulcanizing press

Referring to Figs. 2, 3, 5, 8 and 10, the base 29 of each press 26 is secured to the top cover 60 of the turntable 22 by cap screws 86, and the press cover 31 is pivotally mounted on the base 29 by the hinged joint 32, comprising a pin 87 which extends through lugs 89 on the press cover 31 and through lugs 92 on the press base. The pin 87 is keyed to the lugs 89, and it is rotated in the lugs 92 by a pair of gears 93 which are keyed to the ends of the pin 87 and are adapted to turn the press cover 31 through substantially 180° from its closed position as shown in Fig. 3 to its open position as shown in Fig. 5. The gears 93 are operated by a pair of segmental gears 94 which are keyed to the ends of a shaft 95, and are operated by a piston rod 96 connected to a double acting piston in the hydraulic cylinder 97. The piston rod 96 is connected to a cross head 98 operating in guides 99. The cross head 98 is connected by a link 101 to an arm 102 which is keyed to the shaft 95.

When the press is in its fully opened position, the molded articles are removed from the cavities 34 in the cavity plate 30 and the pin plate 28 and the cavity plate 30 are cleaned and lubricated. Nail retaining washers are then placed on the pins 33 of the pin plate 28 and the mold cavities 34 are filled. When the press has rotated to the position shown in Fig. 5, all of such operations have been performed, excepting the last, and the cavity plate 30 is being filled by the mold filling apparatus 43 under which it is passing. After the cavities 34 have been filled, and the plate 30 has passed underneath the apparatus 43, the piston in the cylinder 97 is actuated to the inner end of its stroke to close the press as shown in Figs. 3, 8 and 10. Dashpots 103, 104 of any well known construction are built into each end of the cylinder 97 for the purpose of cushioning the ends of the opening and closing movements of the press cover 31.

As shown in Fig. 8, the press cover 31 is locked in its closed position by a latch 105, which is pivotally connected to the base 29 of the press by a shaft 106 on which the latch is mounted. The latch 105 extends across one side of the press, and is provided with a downwardly inclined locking face 107, which interlocks with an upwardly inclined face 108 on an outwardly projecting lip 109 on the press cover 31. In effect the outer edge of the surface 107 is raised and fits into a depression of the surface 108 between its raised outer edge and its union with the press cover 31, and thereby securely retains the latch in its locked position when molding pressure is applied by a ram 112. Molding pressure is applied to the stock in the mold cavities 34 by the hydraulically operated ram 112 which carries the pin plate 28 and forces it upwardly against the cavity plate 30 in the cover 31. The latch 105 holds the press cover 31 in its closed position in opposition to the pressure exerted by the ram 112. Due to the inclination of the locking faces 107 and 108 of the latch and the press lip respectively, the pressure exerted by the ram 112 retains the latch 105 in its locked position by virtue of the tendency of the latch to be pulled toward the cover 31 by the inclined surfaces.

The latch 105 is operated by a piston rod 113 having one end connected to a double acting piston operating in a cylinder 114, and the other end is connected to an arm 115 of the latch 105. Before the latch 105 can be moved over the lip 109, the elevated outer edge of the lip must be positioned below the depressed forward edge of the latch surface 107. Therefore the bottom face 116 of the lip 109 is first brought to rest on the top of a pair of supporting rods 117 while the latch 105 is in its released position, as shown in Fig. 5, and in such position the face 107 on the latch 105 can pass over the face 108 on the lip 109 in spaced relation thereto by actuating the piston rod 113. After moving the latch 105 into its locking position the faces 107 and 108 are brought into interlocking engagement by a rod 118 which is actuated by a double acting hydraulically operated piston in the cylinder 119. The ram 112 is then raised to bring the pin plate 28 and the cavity plate 30 into flat contact with each other to seal the mold and apply the molding pressure.

The ram 112 is actuated by a double acting hydraulically operated piston 120, which operates in the cylinder 121 in the base 29 of the press. The piston 120 is provided with a relatively large area 122 which may be exposed to the hydraulic fluid pressure in the chamber 123 for elevating the ram 112. The upper end of the piston 120 has a relatively small area, which may be subjected to the hydraulic pressure in the chamber 124 which is closed by the cylinder head 125. The piston rod 126 of the ram extends through the head 125, which is secured to the cylinder 121 by cap screws 127. Packing rings 128 and 129 are provided respectively in the cylinder head 125 and on the piston 120.

It is desirable to use a higher pressure in the hydraulic system which operates the ram 112 than in the system which operates the other press cylinders, because a relatively high molding pressure should be produced and the other pistons may be operated by lower pressures. When the press cover 31 is closed and the molding pressure is being applied by the ram 112, the supply side of the higher hydraulic system is connected to a pipe 132 which supplies hydraulic fluid to the large piston chamber 123, and the small piston chamber 124 is connected to the return side through a pipe 133. While the molding pressure is being applied, the supply side of the low pressure hydraulic system is connected to the bottom piston chamber in the cylinder 119 through the pipe 134, and the return side of the hydraulic system is connected to the upper piston chamber in the cylinder 119 by the pipe 135; the bottom piston chamber in the cylinder 114 is connected to the supply side of the hydraulic system through a pipe 136, and the upper piston chamber is connected to the return side of the hydraulic system through a pipe 137; and the supply side of the hydraulic system is connected to the piston chamber nearest to the crosshead 98 in the press cover operating cylinder 97 by a pipe 138; and the opposite piston chamber is connected to the return side of the hydraulic system through a pipe 139. When it is desired to open the press, the connections of the ends of the foregoing cylinders with the supply and return sides of the respective hydraulic systems are reversed in each of the cylinders to move the pistons therein downwardly in the order in which the cylinders are mentioned immediately above. The reversal of the connections may be controlled by manually operated valves where a press is operated as a single unit, or such reversal may be controlled as will be hereinafter described by synchronized automatic control valves.

*Press heating*

As particularly shown in Figs. 3 and 8, the press 26 is provided with a heating system for heating the mold halves 28 and 30, carried respectively by the ram 112 and the press cover 31. The pin plate 28, comprising one of the mold halves, is supported on a heating platen 142, which is insulated from the ram by a layer of heat insulation 143. The cavity plate 30, comprising the other mold half, is similarly insulated from the cover 31 by means of heat insulation 144 sandwiched between the heating platen 145 and the cover 31. The platens 142 and 145 are provided with passages 146 and 147 for receiving a heating medium such as steam. The steam is circulated in series through the platens and it is supplied to the platen 145 in the cover 31 through a steam supply pipe 148 (Fig. 3) which is connected to one side of the platen by a swivel connection 149. The steam supply pipe 148 is also provided with swivel joints 150 and 151 to permit the opening and closing of the press cover 31. The steam circulates through the passages 147 and goes out the opposite side of the platen through a pipe 152 which is swivelly connected to the platen 145 and to the platen 142. An intermediate swivel elbow joint 153 is interposed in the pipe 152 to provide a flexible connection to permit the opening and closing of the press cover 31. The steam circulates from the pipe 152 through the passages 146 in the lower platen and passes out the opposite side of the platen through a steam condensate pipe 154 which is connected to the platen 142 by a swivel connection 155. Swivel joints 156 are provided in the pipe 154 to permit the raising and lowering of the ram 112. The steam supply and condensate pipes 148 and 154 of each of the presses 26 are respectively connected to the steam supply and condensate rings 56s and 56c underneath the table cover 60, through pipes 57s and 57c.

Press control mechanism

Each of the presses 26 is automatically controlled by electrically operated hydraulic valves placed beneath the turntable cover 60. Referring to Fig. 3, the ram cylinder 121 is controlled by a valve 157 having pipes 132 and 133 leading therefrom to the bottom and top of the cylinder. The ram cylinder is operated by the high pressure hydraulic system, and the valve 157 is connected to the supply side 46s by a pipe 158, and to the returned side 46r of the system by a pipe 159. The cylinders 114 and 119 for operating the latch 105 and the cover positioning rod 118, respectively, are controlled by a valve 160. The lower ends of the cylinders 114 and 119 are connected to the valve by a pipe 162 leading, respectively, into the branch pipes 134 and 136. The upper ends of the cylinders are connected to the valve 160 by a pipe 163 leading, respectively, into the branch pipes 135 and 137. The valve 160 is connected to the supply ring 47s of the low pressure hydraulic system by a pipe 164, and the valve is connected to the return side or ring 47r by a pipe 165. The cylinder 97 for operating the press cover 31 is controlled by a valve 166 which is connected to the opposite ends of the cylinder by the pipes 138 and 139. The valve 166 is connected to the supply side 47s of the low pressure hydraulic system by the pipe 164, and the valve 166 is connected to the return side or ring 47r of the hydraulic system by the pipe 165. The valves 157, 160, and 166 are operated by solenoids positioned at each of their ends.

Referring to Fig. 12, the solenoids for actuating the valves 157, 160, and 166 of each of the presses are energized as the presses rotate through fixed stations in the press manipulating arc shown in Fig. 2. The solenoids are energized by electrical current in the electrical line comprising the wires 167 and 168, which are supplied with current from the rings 169 and 170 (Fig. 4) on the base 65 of the pintle center of the turntable, to which the wires 167 and 168, respectively, are connected by brushes 171 and 172 which are carried by the turntable. The circuits for the various solenoids are made and broken by switches 173, 174, 175, and 176 positioned underneath the turntable cover 60, and carried by the turntable, and by switches 177 and 178 carried by each of the presses, and actuated respectively by the operation of the latch 105 and the press cover 31. The switches 177 and 178, and the mechanism for actuating them are shown in Figs. 8, 9, 10 and 11. The switches 173 to 176 are actuated by fixed cams 179, 182, 183, 184, and 185 positioned within the well 25 below the turntable. The switches 173 to 176 are mounted on a member 186 carried by the turntable, and the switches are normally held in their open positions by springs 187. The switches are provided with cam rollers 188, which are in circular alignment with one or more of the fixed cams, so that when the rollers 188 contact the cams, the switches are closed, and after the rollers have passed over the cams the switches are opened by the springs 187.

The press parts are schematically illustrated in Fig. 12, and they are in the position of the corresponding parts of the press 26A shown in Fig. 2, after it has passed through the heat treating or vulcanizing zone. In such position the press cover 31 is closed, the ram 112 is in its upper position, and all of the switches 173 to 178 are open. As the press passes into the mold manipulating arc, the switch 173 is closed when its cam roller 188 contacts the cam 179. A circuit is then made across the electrical main 167, 168 through the solenoid 189 of the hydraulic valve 157 which controls the movement of the ram 112. The valve 157, may be of the construction shown in Fig. 13, and when the solenoid 189 is energized, the valve piston 190 is moved to the left from its full line position to its dot dash line position as shown in Fig. 13. When the valve piston 190 was in its full line position, the hydraulic fluid supply pipe 158 was connected to the bottom piston chamber 123 through the middle valve piston groove 191 and the pipe 132; and the upper piston chamber 124 was connected to the return pipe 159 through the pipe 133 and left valve piston groove 191'. The reversal of the valve piston 190 to its dot dash line position as shown in Fig. 13, reverses the connections of the supply and return pipes 158 and 159 with the ends of the cylinder 121, and thereby supplies hydraulic fluid to the upper piston chamber 124 and exhausts fluid from the lower chamber 123. In which case the pipe 132 is connected to return pipe 159 through port P, groove 191'', port P', and passage P₂; and the pipe 133 is connected to the supply pipe 158 through port P₃, groove 191 and port P₄. The ram 112 is thus forced downwardly and separates the mold halves 28 and 30.

The valves 160 and 166 are similar in their construction and action to the valve 157, and they are actuated in the order named as the press continues to rotate. The valve piston in the valve 160 is reversed by energizing the solenoid 192, which occurs when the switch 174 is closed by its cam roller 188 making contact with the cam 182. When the solenoid 192 is thus energized, the low pressure hydraulic supply pipe 164 is connected through the valve and pipe 163 to the upper piston chambers in the cylinders 114 and 119, and the return pipe 165 of the hydraulic system is connected to the lower piston chambers of the cylinders through the valve and the pipe 162. A restriction is placed in branch pipe 137 which causes the piston in the cylinder 119 to be lowered before the piston in the cylinder 114. The piston rod 118 is thus lowered and permits the press cover 31 to drop downwardly on to the supporting rods 117 (Fig. 8). The interlocking engagement between the latch 105 and the cover lip 109 is thus released. The piston in the cylinder 114 next moves downwardly, and pivots the latch 105 to its unlocked position as shown in Fig. 5. The latch 105 has an arm 193 attached thereto which is provided with an end 194, which actuates an arm 195, connected to the switch 177, and closes it as the latch moves to its unlatched position.

Upon closing the switch 177, the solenoid 196 of the valve 166, which controls the press cover operating cylinder 97, is energized and reverses the connection of the ends of the cylinder with the hydraulic fluid supply pipe 164 and the return pipe 165. Hydraulic fluid is thereby exhausted from the right end of the cylinder 97 (as viewed in Figs. 3 and 12) through the pipe 138 and it is supplied to the right end of the cylinder through the pipe 139. The piston rod 96 moves outwardly and pivots the press cover 31 through 180° from its closed position to its open position, as shown in Fig. 5. When the end 194 of the arm 193 moves over the roller on the switch arm 195, the spring 197 pulls the switch 177 to its open position, and it is resiliently held in such position between the springs 197 and 198.

As shown in Figs. 10, 11, and 12, each press 26 is provided with the switch 178, which is closed at the end of the closing movement of the cover 31, but it is not closed during the opening movement. During the opening movement, however, the mechanism for operating such switch is moved to its switch actuating position by the weight of a link 199 which is pivoted at one end to a lever 202 adapted to be actuated by the cover 31, and it is pivoted at its other end to a bell crank lever 203 adapted to move the switch 178 to its closed position when the lever 203 is swung in a counterclockwise direction by the cover 31. When the cover 31 is closed as shown in Fig. 12 the lip 109 of the cover rests upon a roller 204 on the arm 202 which is pivoted on a pin 205 on the base of the press. When the lip 109 on the cover 31 rises away from the roller 204, the weight of the link 199 moves the bell crank lever 203 in a clockwise direction over the cam roller 206 on the switch arm 207 of the switch 178. When the end of the arm 203 is moved over the roller 206, the switch 178 is moved to a further open position, but it is returned to its normal open position by the springs 208 and 209 after the passage of the arm.

While the press cover 31 is open, the cured molded articles are removed from the cavity plate, and the mold halves are cleaned, and lubricated, and the cavity plate 30 is filled, and the washers are placed on the pins of the plate 28 as hereinafer described. After these operations have been performed, the press has reached the position just beyond the position of press 26C shown in Fig. 2. The press cover 31 is then closed by reversing the position of the valve piston in the valve 166 to the position shown in Fig. 12, which occurs when the switch 175 is closed by its cam roller 188 making contact with the fixed cam 183. The solenoid 212 is thereby energized and the valve piston in the valve 166 is reversed to the position shown in Fig. 12, and the piston in the cylinder 97 is thereby moved to its inward position shown in Fig. 12. The movement of the piston rotates the cover 31 carrying the filled cavity plate 30 over the pin plate 28, and the lip 109 of the cover comes to rest on the supporting rods 117. Just before the press cover lip 109 comes to rest, it pushes the roller 204 downwardly and closes the switch 178, and thereby energizes a solenoid 213 for operating the valve 160 for the positioning and latch controlling cylinders 119 and 114. When the switch 178 is closed it also energizes the solenoid 214 for the valve 156 which controls the ram cylinder 121. The pistons in the valves 160 and 157 are simultaneously moved to the right, and the valve pistons assume the positions shown in Fig. 12. Hydraulic fluid is thereby admitted to the lower piston chambers in the cylinders 119, 114, and 121, and the fluid is exhausted from the upper piston chambers. The rate of flow of fluid to the respective chambers is so controlled by restrictions into the pipes leading to the respective chambers that the pistons in the cylinders 114, 119 and 121 are moved upwardly in the order named. The piston rod 113 is first moved upwardly and it pivots the latch 105 to its locking position. The piston in the cylinder 119 then moves the rod 118 upwardly against the cover lip 109 and interlocks the upper face of the lip with the lower face of the latch 105. The ram 112 is next moved upwardly and it brings the mold halves 28 and 30 together. The high pressure hydraulic fluid being supplied to the relatively large area of the bottom of the piston 120, the mold halves are held together with the relatively high pressure which reduces the molding flash to a very small amount.

The mold halves 28 and 30 are immediately bumped by lowering and raising the ram 112 for the purpose of releasing any air that may be trapped in the mold, and to insure that the mold will be more securely closed. The bumping operation is performed by closing the switch 173 and thereby reversing the valve piston in the valve 157 to cause the ram 112 to be lowered, and by immediately closing the switch 176 to thereby again reverse the valve piston in the valve 157 to cause the ram 112 to be again raised. The switch 173 is closed by its cam roller making contact with the fixed cam 184, and the switch 176 is closed by its cam roller making contact with the fixed cam 185. The beneficial high molding pressure is maintained during the remainder of the curing cycle of the press which is continuously heated as hereinbefore described, and when each of the presses reaches the position of the press 26A after having passed through the arc of the curing cycle the molded articles in the presses have been cured and the presses are in position to be opened and emptied, and may thus repeat the cycle of operations.

Whereas the foregoing operation of the press has been in reference to a press or a plurality of them mounted on a revolvable turntable, it will be readily understood that a single press or a plurality of them stationarily mounted may be operated in substantially the same manner by moving the cams 179 to 185 against the cam rollers 188 and thereby actuate the switches 173, 174, 175 and 176 attached thereto. Where the cams 179 to 185 are moved, they may be mounted on the circumference of a cylinder, which may be rotated in respect to the cam rollers 188 manually or by timed power drive.

*Mold filling apparatus*

Referring to Figs. 2, 5, and 6, the mold cavities 34 of the cavity plate 30 are automatically filled as the cavity plate passes underneath the mold filling apparatus 43. The press cover 31 containing the cavity plate 30 is supported in its open position on the periphery of the well of the turntable by a roller track 214 comprising rollers 215, upon which a flat surface 216 on the top of the press cover 31 is supported in rolling contact. The flat upper surface 217 of the upturned cavity plate passes underneath and makes sliding contact with the flat surface 218 of the extrusion nozzle 219 at the end of the extrusion cylinder 220, and the plastic 221 contained in the cylinder is extruded into the mold cavities 34 by a piston 222. As shown in Fig. 6, the flat surface 218 of the extrusion nozzle 219 is sufficiently wide to provide an area around the nozzle orifice 223 to insure that such area will completely cover any cavity 34 while the orifice 223 is passing over such cavity, and thereby prevent the plastic 221 from being forced through the cavity 34 and around the end of the nozzle 219. The cavities 34 are completely filled by the extrusion nozzle 219, and it wipes the matching surface of the cavity plate clean as the nozzle passes over the plate. The intimate contact between the flat surfaces 217 and 218 of the cavity plate and the extrusion nozzle may be adjusted by the adjusting screws 224 which are anchored in the extrusion cylinder 220 and are carried by lugs 225 on the frame 226 of the filling apparatus. The vertical position of the nozzle 219 may be adjusted by nuts 227 positioned on either side of the lugs 225. The walls of the extrusion cylinder 220 are heated by a heating medium, such as hot water, circulated through a passage 228 in the cylinder walls. The passage 228 is in the form of a coil which passes around the cylinder. The water is conveyed thereto through a pipe 229 and the water is returned through the pipe 232.

The extrusion piston 222 is operated by a rod 233, which is controlled by a piston in the cylinder 234 affixed to the top of the frame 226. Hydraulic fluid is supplied to and exhausted from the top and bottom ends of the cylinder 234 through the pipes 235 and 236, which are connected to the top and bottom ends of the cylinder and to a control valve 237 (Fig. 2). Hydraulic fluid is supplied to the valve 237 by a pump 238 which is connected to a sump 239, and pumps the fluid to the valve through a supply pipe 242. The hydraulic fluid is returned from the valve 237 to the sump 239 by a pipe 243. The pump 238 is driven by a motor 244.

The valve 237 may be of the construction shown in Fig. 13, wherein it is operated by solenoids placed at each of its ends, and controlled by the movement of the press cover 31 for operating the piston 222 in the extrusion cylinder 220, as diagrammatically illustrated in the wiring and piping diagram shown in Fig. 14. Hydraulic fluid is being admitted to the bottom of the cylinder 234 and is being exhausted from the top of the cylinder so as to raise the extrusion piston 222 out of the extrusion cylinder 220. Plastic material 221 to be molded has been placed in the top of the cylinder 220 underneath the piston 222 and is in position to be extruded through the orifice 223 by the downward movement of the piston 222. The upturned cavity plate 30 in the open cover 31 is moving in the direction of the arrow B towards the extrusion nozzle 219. The cover 31 is provided with a cam 245 which is adapted to strike the cam rollers 246 and 247 in succession so as to close the switches 248 and 249 in succession to thereby energize the solenoids 252 and 253 in succession, to first move the piston in the valve 237 to the right and admit hydraulic fluid in the top of the cylinder 234 and exhaust it from the bottom of the cylinder to lower the extrusion piston 222, and then to reverse the flow of the hydraulic fluid to the ends of the cylinder so as to raise the extrusion piston 222 to the upper position as shown. The switch 248 is closed immediately after the first row of mold cavities 34 is advanced underneath the orifice 223 of extrusion nozzle 234 so as to bring the piston 222 downwardly and extrude the molding plastic 221 into the mold cavities as they pass underneath the extrusion nozzle 219. Immediately after the last row of mold cavities 34 have passed underneath the nozzle 223, the switch 249 is closed and the piston 222 is raised to stop the extrusion of the plastic and place the piston in position to enable the extrusion cylinder 220 to receive another batch of the plastic 221. Each of the switches 248 and 249 are provided with tension springs 254 for immediately opening the switches after the cam 245 has passed over the cam rollers 246 and 247 respectively.

For the purpose of cleaning any adhering molding plastic 221 from the extrusion orifice 223 and the cylinder 220, when the turntable has been stopped for a shut-down, a hydraulic cylinder 255, located immediately underneath the extrusion nozzle 219, is adapted to actuate a head 256 upwardly into the orifice 224 and cylinder 220. The head 256 is operated by a piston in the cylinder 255. The piston may be elevated by closing the manually operated switch 257 which energizes the solenoid 258. The piston in the valve 259 is thereby moved to the left and admits hydraulic fluid to the bottom of the cylinder 255 and exhausts it from the top of the cylinder. The head 256 is returned to its lower position by closing the switch 262 which energizes the solenoid 263 and reverses the connection between the supply and the return hydraulic pipes 242 and 243 respectively to the ends of the cylinder 255.

*Cleaning and lubricating apparatus*

Referring to Figs. 2 and 7, the cleaning and lubricating apparatus, comprising the motors 36 for driving the cleaning brushes, the air blast pipe 37, and lubricant spray nozzles 38 for operating upon the pin plate 28, and the motors 40, the air blast pipe 41, and the lubricant spray nozzles 42 for operating upon the cavity plate 30, is supported on a frame 264, which overhangs the turntable 22 and is braced by straps 265 extending from fixed posts 266. The cleaning and lubricating apparatus for operating upon the pin plate 28 and the cavity plate 30 are similar, and therefore only the latter set of apparatus, which is particularly shown in the elevational view in Fig. 7, will be described in detail herein. The motors 40 are supported on a plate 267 carried by a beam 268 forming a part of the frame 264. Shafts 269 are driven by the motors 40, and they extend downwardly through the plate 267 and drive cleaning brushes 270, which are rotated in contact with the upturned face of the cavity plate 30. The air blast pipe 41 is located immediately in rear of the brushes 270, and it is provided with orifices 271, through which a blast of air is discharged to blow any loose particles of molding material from the mold face 217 and the cavities 34 therein, which have not been removed from the mold by the rotating brushes 270. The air is led to the air blast pipe 41 through a pipe 272.

The two spray nozzles 42 are arranged immediately in rear of the air blast pipe 41. At any instant the spray from the nozzles covers one-third of the mold face, or two of the radial or transversely extending rows of cavities 34, and the nozzles are placed into operation three times at selected intervals to cover the entire face of the mold as it passes underneath the nozzles.

The air blast is continuously discharged from the orifices 271 in the air blast pipe 41 during the passage of the face of the cavity plate thereunder. Referring to Figs. 16 and 17, the air blast is started as soon as the advanced edge 273 of the cavity plate 30 comes within its effective range, and the blast is cut off when the rear edge passes out of range of the air blast. The lubricant may be in the form of a soap solution which is supplied to the nozzles through the pipes 274, and it is sprayed from the nozzles by the admission of air under pressure through the pipe 275 leading to the nozzles 42. Such nozzles 42 may be of known standard construction which are adapted to form a spray by the admission of air thereto.

The controls for admitting air and cutting it off from the pipes 272 and 275 for cleaning and lubricating the cavity plate 30 are particularly shown in Figs. 16 and 17, together with corresponding controls for the corresponding pipes for cleaning and lubricating the pin plate 28. The controls are supported on the curved rail 278 shown in Figs. 2 and 16 which overhangs the turntable 22 and forms a part of the overhanging frame 264 shown in Fig. 2. Fig. 17 is a horizontal section on line 17—17 of Fig. 16 through the supports 279 for the controls, and in which there is shown a plan view of one-half of a pin plate 28, and of a cavity plate 30 in an open press substantially in the position of the press 26B in Fig. 2. Only one-half of the cavity and pin plates 30 and 28 and the cleaning and lubricating apparatus associated therewith is illustrated in the drawings since the other half of such apparatus is the same. The parts shown in Fig. 17 comprise one of the brushes 282 driven by one of the motors 36 for cleaning the pin plate, a portion of the air blast pipe 37 and one of the nozzles 38 adapted to operate upon pin plate 28; and one of the brushes 270 operated by one of the motors 40, a portion of the air blast pipe 41, and one of the lubricating nozzles 42 adapted to operate upon a cavity plate 30. As illustrated in Fig. 17 the press is moving in the direction of the arrow C, and the brush 282 is cleaning the most advanced surface of the pin plate 28, and the air blast pipe 37 is about to begin to discharge air on the plate. Air is admitted to the air blast pipes 37 and 41 and the lubricant spray nozzles 38 and 42 from a common pipe 283 having a plurality of branch pipes leading therefrom to which air is admitted from the common pipe 283 through valves controlled by a cam 284 affixed to the gear 93 by which the press cover is operated. The cam 284 makes contact with a plurality of cam rollers arranged in its path. The movement of the cam rollers by the cam operates the air valves at the proper times to discharge the air and the lubricant spray upon the plates 28 and 30.

As the press continues its movement in the direction of the arrow C the cam 284 makes contact with the first cam roller 285 and opens a valve 286, which admits air from the pipe 283 to a pipe 287 leading to the air blast pipe 37. The valve 286 is opened by a cam 288, which is pivoted on a pin 289 and is actuated by the arm 292 on which the roller 285 is mounted. When the cam 284 on the press 26 makes contact with the roller 285, the valve stem 293 is moved upwardly along the cam surface 294, and the stem is held in such the cam position by the cam surface, 295, after the cam 284 has passed underneath the cam roller 285. The valve head 286' of the valve 286 is thereby retained in its open position, and the air blast continues to be directed upon the surface of the pin plate 28 as the plate travels underneath the pipe 37.

Next in order the cam 284 strikes the cam roller 296 after passing under the cam roller 285 and opens the valve 297, which admits air to the pipe 298 leading to the spray nozzles 38. When the air reaches the nozzles 38 about one-sixth of the surface of the pin plate has passed underneath them, and the pin plate 28 is in position to have about one-third of its area sprayed with the mixture of air and the lubricant which enters the nozzles 38 through the pipe 299. The stem 302 of the valve 297 is operated by the bell crank lever 303, which is pivoted on the support 279 and carries the roller 296. Immediately after the cam 284 passes underneath the roller 296, the bell crank lever 303, which actuated the valve stem 302 upwardly, drops back into place and permits the valve 297 to close. The valves 304 and 305 are opened at the proper times to separately spray the lubricant onto the remaining middle and last third of the surface of the pin plate 28. The valves 304 and 305 are constructed and operated in the same manner as the valve 297 by the cam 284 which strikes the cam rollers 306 and 307. The valve 286 which controls the air to the air blast pipe 37 is closed simultaneously with the operation of the spray valve 305 by the cam 284 striking the cam roller 308, which was pulled to its downward position by the first movement of the cam roller 285 through the linkage comprising the link 309, which is connected to the pivoted lever 312 of the roller 308 and to the arm 292 of the first cam 288. When the cam 284 strikes the roller 308, the cam 288 is moved to its position shown in Fig. 16. In such movement, the valve stem 293 slides down the cam surface 294 and permits the valve 286 to close. This completes the cleaning and lubricating operation on the pin plate 28.

The cleaning and lubricating operations are begun on the cavity plate 30 before such operations are completed on the pin plate 28. Such operations are performed on the cavity plate 30 in the same manner as they are performed on the pin plate 28, and corresponding apparatus is employed. An air valve 313 corresponding to the air valve 286 is opened by the cam 284 striking the cam roller 314, and air is thereby admitted continuously through the pipe 272 leading to the air blast pipe 41 while the cavity plate 30 is passing underneath it. The cam then strikes in succession the rollers 315, 316, and 317 for opening the valves 318, 319 and 320, in succession to admit air to the pipe 275 and operate the spray nozzles 42, three separate times, and at intervals to cover the entire surface of the cavity plate 30. Simultaneously with the operation of the last spray valve 320 the second air blast valve 313 is closed by the cam 284 striking the roller 323. Motion is transmitted to the air blast valve 313 through the link 322 connected to the valve operating rollers 323 and 314.

*Washer placing machine*

Referring to Figs. 2 and 7, the washer placing machine 39 is suspended from the overhanging frame 264 between the outer curved rail 278 and the inner curved rail 324. The machine comprises a hopper 325, within which a grooved rotor 326 is rotated by a motor 327 for placing washers in the chutes 328. As the pins 33 on the pin plate 28 pass underneath the chutes 328 the washers are automatically placed on the pins in accordance with the methods disclosed in United States Patent No. 1,501,492, or No. 1,822,099.

Whereas, the preferred form of the invention has been shown and described herein, it will be understood that changes may be made without departing from the spirit of the invention and the scope of the appended claims.

Having thus described our invention, what we claim and desire to protect by Letters Patent is:

1. In a molding apparatus, a rotatable turntable, means for rotating said turntable, a plurality of molding presses mounted on said turntable, each of said presses comprising separable mold halves, at least one of said mold halves having mold cavities therein, means for matching said mold halves to close said cavities and for separating said mold halves to open said cavities in an upwardly facing position, means for filling said upwardly facing mold cavities comprising an extrusion nozzle, means for holding said nozzle in contact with the upturned face of said mold half having the cavities therein, and means for extruding plastic material into said cavities during the rotation of said presses.

2. In a molding apparatus, a rotatable turntable mounted on a base, means for rotating said turntable, a plurality of molding presses mounted on said turntable, each of said presses comprising separable mold halves, at least one of said mold halves having mold cavities therein, mechanism for matching said mold halves to close said cavities and for separating said halves to open said cavities, controls for said mechanism, means affixed to said base at stations around the center of said turntable and adapted to actuate said controls to open and close said mold cavities as said presses pass predetermined stations on said base, and means for filling said open mold cavities comprising an extrusion nozzle, means for holding said nozzle in contact with the open face of said mold having the cavities therein, and means for extruding plastic material into said cavities during the rotation of said open cavities.

3. In a molding apparatus, a rotatable turntable adapted to be mounted on a foundation, means for continuously rotating said turntable during the molding operations, a plurality of molding presses mounted around the center of said turntable, each of said presses comprising a base secured to said turntable, a cover pivoted on said base, a mold half carried by said press base, a mold half carried by said press cover and having cavities therein adapted to be closed by said other mold half, means for swinging said cover from a closed downwardly facing position to an opened position with said mold cavities facing upwardly, means for supporting said cover on said foundation independently of said turntable, means for forcing plastic material into said upwardly facing mold cavities while said cover is so independently supported, and said means for swinging said cover being adapted to return it to the closed position.

4. In a molding apparatus, a rotatable turntable adapted to be mounted on a foundation, means for continuously rotating said turntable during the molding operations, a plurality of molding presses mounted around the center of said turntable, each of said presses comprising a base secured to said turntable, an upwardly facing mold half carried by said base, a cover for said press pivoted on said base and containing a mold half having cavities therein adapted to be closed by said other mold half, means for swinging said cover from its closed position to an open position outside of the outer periphery of said turntable with said mold cavities facing upwardly and returning said cover to its closed position, means for supporting said cover in said open position on said foundation independently of said turntable, a stationary extruding nozzle adapted to wipe the face of said mold in said open cover during its rotation under said nozzle, and means for extruding plastic material into said mold cavities through said nozzle.

5. A molding apparatus for molding articles containing preformed inserts, comprising a turntable, means for continuously rotating said turntable during all of the molding operations, a plurality of molding presses mounted on said turntable around the center thereof, each of said presses comprising a base secured to said turntable, a mold half having a cavity closing face maintained in an upwardly facing position on said base, insert supporting pins extending upwardly from said face, a mold half having cavities therein pivoted on said base, means for pivoting said cavity containing mold half over said other mold half with said cavities immediately over said pins and reversing said pivotal movement to upwardly turn the open face of said cavity containing mold half, a stationary extruding nozzle means for holding said nozzle in contact with the rotating upwardly turned face of said mold half having the cavities therein, and means for extruding and compacting plastic material from said nozzle into said cavities with sufficient tightness to be retained therein during the pivotal movement thereof over said pin supporting mold half.

6. A molding apparatus adapted to mold articles having preformed inserts therein, comprising a turntable, means for continuously rotating said turntable during the operation of said apparatus, a plurality of molding presses mounted on the margin of the outer perimeter of said turntable, each of said presses comprising a base, a cover pivoted on said base, a mold half having cavities therein carried by said cover, a pin plate forming the other mold half carried by said base, insert retaining pins affixed at one end to said plate and projecting above the surface of said plate, said pins being adapted to project into said cavities when they are closed against said plate, means for pivoting said cover to open and close said cavities, means for placing inserts on said pin, and means for filling said cavities while they are open.

7. In an apparatus for molding articles having preformed inserts therein, said apparatus comprising a turntable, means for continuously rotating said turntable during the operations performed by the apparatus and relating to the moldings of articles thereon, a plurality of molding presses mounted on the margin of the outer perimeter of said turntable, each of said presses having a base and a cover pivoted thereon, a mold half carried by said cover and containing cavities therein, a second mold half carried by said base, and having insert retaining pins projecting from its face, means carried by said turntable for actuating said covers from their mold closed positions over said second mold halves to an upwardly facing position, separated means fixed in respect to and cooperating with means on said turntable for energizing said cover actuating means to pivot said covers from their mold closed positions to the mold open positions, mechanism arranged at fixed stations in series around the arc of travel of the open upwardly facing mold halves for successively cleaning, lubricating, and applying inserts onto said insert pins, and separate mechanism for successively cleaning, lubricating, and filling said cavity mold half, means for energizing said cover actuating means to pivot said covers from the open filled position to the mold closed position, and means for heating said filled cavities while said cavities are closed.

8. A rubber heel molding machine, comprising a turntable adapted to be rotatably mounted on a foundation, a plurality of molding and vulcanizing presses mounted on the outer margin of said turntable, each of said presses having a base secured to said turntable, a mold half carried by said base with its mold closing face maintained upwardly, washer supporting pins extending upwardly from said face, a mold half having cavities therein adapted to be pivoted through 180° from its mold closing position over said first mold half with the bottom of said cavities facing downwardly to a mold open and filling position with the bottom of said cavities facing upwardly, individual means operable during the rotation of said turntable for cleaning and intermittently spraying both of the upwardly turned mold faces, filling said mold cavities, and placing washers on said pins, means for opening and closing said cavities carried by said turntable, said means for filling said molds being supported on said foundation independently of said turntable, means supported on said foundation independently of said turntable for controlling said means for opening and closing said cavities, and means carried by said turntable for controlling said mold filling means.

9. A molding apparatus comprising a turntable, means for continuously rotating said turntable during the complete cycle of operations of the apparatus employed in the manufacture of molding articles thereon, a plurality of molding presses mounted on the outer peripheral margin of said turntable, each of said presses comprising a base mounted on said turntable and a cover pivoted on said base about an axis substantially perpendicular to the radius of the turntable passing through the center of said press, a mold half mounted on said base, a mold half mounted on said cover in position for its downwardly turned face to match with the upwardly turned face of said first mold half when said cover is closed, said mold half on said cover having molding cavities therein adapted to receive the plastic material to be molded and to retain the molded article when said cavities are opened, means for successively turning said cover and cavity mold half of each press toward the outer periphery of said turntable from their downwardly turned mold closed position to an upwardly turned mold open position during the rotation of each press between fixed points, separate means fixed over the path of rotation of said open cavity mold halves for successively cleaning, lubricating and filling said cavity mold halves of each press, means fixed over said base for cleaning said mold halves on the base of each press, and means for successively closing said presses.

10. An apparatus for molding articles containing preformed inserts, said apparatus comprising a turntable, means for continuously rotating said turntable during the complete cycle of operations of the apparatus employed in the manufacture of molded articles thereon, a plurality of molding presses mounted on the outer peripheral margin of said turntable, each of said presses comprising a base mounted on said turntable and a cover pivoted on said base about an axis substantially perpendicular to the radius of the turntable passing through the center of said press, an upwardly turned mold half mounted on said base, insert retaining pins extending from the upwardly turned face of said mold half, a second mold half mounted on said cover in position for its downwardly turned face to match with the upwardly turned face of said first mold half when said cover is closed, said mold half on said cover having molding cavities therein adapted to match with said pins when said cavities are closed and to receive the plastic material to be molded and to retain the molded article when said cavities are opened, means for successively turning said cover and cavity mold half of each press toward the outer periphery of said turntable from their downwardly turned mold closed position to an upwardly turned mold open position during the rotation of each press between fixed points, separate means fixed over the path of rotation of said open cavity mold halves for successively cleaning, lubricating and filling said cavity mold halves of each press, means fixed over said base for successively cleaning said mold halves on the base of each press and placing inserts on said pins, and means for successively closing said presses.

11. A molding apparatus comprising a rotatable turntable adapted to be mounted on a foundation, means for continuously rotating said turntable during the operation of the apparatus, a plurality of molding presses mounted around the center of said turntable, each of said presses comprising a base secured to said turntable, a vertically reciprocable ram carried by said base, a mold half having a cavity closing face maintained in an upwardly facing position on said ram, a mold half having cavities therein pivoted on said base, means for pivotally moving said cavity containing mold half from a closing position over said mold half on said ram through substantially 180° to a cavity filling position and reversely moving said mold half, means supported on said foundation independently of said turntable for filling said cavities while in said filling position, means for locking said cavity containing mold half over said ram immediately after being brought into such position and unlocking said half immediately before said half is moved to its cavity filling position, means for moving said ram upwardly and the mold half thereon against the cavity filled mold immediately after being locked and reversing said ram movement immediately after said cavity filled mold is unlocked, and stationary means on said foundation cooperating with said operating means on said turntable for controlling said movements of said ram, mold lock, and cavity containing mold half, and means carried by said turntable for controlling said mold filling means.

EVERETT W. HOWE.
HARRY E. COOPER.
OTTO F. HOMEIER.

References Cited in the file of this patent
UNITED STATES PATENTS

| Number | Name | Date |
| --- | --- | --- |
| 473,505 | Hoff | Apr. 26, 1892 |
| 1,537,697 | Roberts | May 12, 1925 |
| 1,562,573 | Matter | Nov. 24, 1925 |
| 1,807,155 | Frederick | May 26, 1931 |
| 1,822,099 | Kmentt | Sept. 8, 1931 |
| 1,900,456 | Mead | Mar. 7, 1933 |
| 1,991,706 | Seabury | Feb. 19, 1935 |
| 1,992,314 | Laussucq | Feb. 26, 1935 |
| 2,117,400 | Cobb | May 17, 1938 |
| 2,346,519 | Tornberg | Apr. 11, 1944 |
| 2,508,301 | Stacy | May 16, 1950 |